(12) United States Patent
Chin

(10) Patent No.: US 6,867,165 B2
(45) Date of Patent: Mar. 15, 2005

(54) CALCIUM HYDROXIDE ABSORBENT WITH RHEOLOGY MODIFIER AND PROCESS INVOLVING SAME

(75) Inventor: David Chin, Charlestown, MA (US)

(73) Assignee: W. R. Grace & Co. -Conn., Columbia, MD (US)

( * ) Notice: Subject to any disclaimer, the term of this patent is extended or adjusted under 35 U.S.C. 154(b) by 263 days.

(21) Appl. No.: 10/237,772

(22) Filed: Sep. 9, 2002

(65) Prior Publication Data

US 2004/0048742 A1 Mar. 11, 2004

(51) Int. Cl.⁷ .................................................. B01J 20/00
(52) U.S. Cl. ...................................... 502/400; 502/208
(58) Field of Search ............................... 502/208, 340, 502/400

(56) References Cited

U.S. PATENT DOCUMENTS

| | | | |
|---|---|---|---|
| 2,322,206 A | 6/1943 | Gardenier et al. | 252/189 |
| 4,407,723 A | 10/1983 | MacGregor et al. | 252/192 |
| 4,997,803 A | 3/1991 | van der Smissen et al. | 502/400 |
| 5,030,610 A | 7/1991 | Sakata et al. | 502/400 |
| 5,390,667 A | 2/1995 | Kumakura et al. | 128/205.12 |
| 6,228,150 B1 | 5/2001 | Armstrong et al. | 95/139 |

FOREIGN PATENT DOCUMENTS

| | | | | |
|---|---|---|---|---|
| CA | 2009731 | 2/1990 | | B01J/20/02 |
| DE | 96 839 | 6/1972 | | A62D/9/00 |
| DE | 2316214 | 3/1973 | | A62D/9/00 |
| DE | 172529 | 4/1973 | | A62D/9/00 |
| DE | WP A 62 d/163 396 | 4/1973 | | A62D/9/00 |
| DE | 2316214 | 12/1973 | | A62D/9/00 |
| DE | 692 03 996 T2 | 8/1992 | | B01J/20/04 |
| EP | 0 530 731 B1 | 8/1995 | | B01J/20/04 |
| JP | 57-061265 | 4/1982 | | B01J/20/04 |
| JP | 02-015617 | 1/1990 | | B28B/1/14 |
| JP | 03-222567 | 9/1991 | | B01J/20/04 |
| JP | 05-177475 | 6/1993 | | C04B/38/02 |
| WO | WO 98/23370 | 4/1998 | | B01J/20/04 |
| WO | WO 02/16027 A1 | 2/2002 | | B01J/20/04 |

OTHER PUBLICATIONS

Patent Abstracts of Japan, Akira et al., 07–010654, Jan. 13, 1995.
Patent Abstracts of Japan, Kazumasa, 03–219912, Sep. 27, 1991.
Patent Abstracts of Japan, Hachiro, et al., 58–177137, Oct. 17, 1983.
Patent Abstracts of Japan, Manami, 05–57182, Mar. 9, 1993.
"US6310143: Derivatized polycarboxylate dispersants", Thomas M. Vickers et al., www.delphion.com, Oct. 30, 2002, pp. 1–9.
"A new generation of $CO^2$ absorbent", P. Fish, Boots Healthcare, Jun. 29, 1999.
A New Carbon dioxide Absorbent for Use in Anesthetic Breathing Systems, Murray et al., Anesthesiology 1991:5, 1999.
Dequest Property 2066, no date.
Dequest Property 2066A, no date.
Dequest Property 2066C2, no date.
Dequest Property 2060S, no date.
Dequest Property 2000, no date.
Dequest Property 2006, no date.
Dequest Property 2010, no date.
Dequest Property 2016, no date.
Dequest Property 7000, no date.

*Primary Examiner*—Stanley S. Silverman
*Assistant Examiner*—Edward M. Johnson
(74) *Attorney, Agent, or Firm*—Craig K. Leon; William L. Baker

(57) ABSTRACT

Exemplary carbon dioxide absorbent compositions of the invention incorporate calcium hydroxide, water, and a phosphonic acid or salt thereof. The composition is made into a paste and formed into particles that are conveniently and efficiently processable. When hardened, the particles have excellent carbon dioxide absorbent performance, crush resistance, and pore structure.

20 Claims, No Drawings

CALCIUM HYDROXIDE ABSORBENT WITH RHEOLOGY MODIFIER AND PROCESS INVOLVING SAME

FIELD OF THE INVENTION

The present invention relates to carbon dioxide absorbents for use in a gaseous stream, and more particularly to absorbent particles comprising calcium hydroxide and a rheology modifier for improving processing of the absorbent composition and enhancing its carbon dioxide absorption performance when formed into particles.

BACKGROUND OF THE INVENTION

A carbon dioxide absorbent is typically produced by mixing hydrated lime, $Ca(OH)_2$, with water and optionally a small amount of sodium or potassium hydroxide to form a paste, which is then extruded or molded into particles, in granular or pellet form, approximately 2–3 mm in diameter and 2–5 mm in length. So-called soda lime absorbents are typically used in hospital operating rooms for inhalation anesthesiology, in recovery room re-breathing devices, and in underwater breather systems and devices. They are loaded in loose particulate form or contained within convenient disposable cartridges.

To indicate the progressive exhaustion of the absorbent, a color indicator dye which is sensitive to pH, such as diethyl violet (DEV), is added during manufacture. The dye in this case changes from a colorless state to the color purple as absorption proceeds. The state of substantial exhaustion of the carbon dioxide absorption capacity is indicated by a deep purple color. However, when the absorbent is allowed to sit idle for several hours or more after usage, the purple color can slowly fade and revert to a near colorless state. This renders it difficult for medical personnel to ascertain the absorption capacity remaining, although the purple color will eventually return when the absorbent is again exposed to carbon dioxide.

Thus, it is an objective of the present invention to prevent or minimize the reversion to colorlessness of the indicator dye.

Another objective of the present invention to prevent or minimize degradation of certain anesthetic agents. Carbon dioxide absorbents such as soda lime can cause certain anesthetic agents (e.g., sevoflurane) to degrade slightly by extracting an HF molecule to form an undesired olefin byproduct referred to as "Compound A" with the formula $CF_2=C(CF_3)OCH_2F$. Soda lime that contains extremely low levels of moisture can also cause other volatile anesthetic agents, such as desflurane, enflurane, and isoflurane, to degrade and form carbon monoxide.

It is also an objective of the present invention to provide a calcium hydroxide-containing absorbent that minimizes the degradation of certain volatile anesthetic agents to either Compound A (an undesired byproduct) or carbon monoxide.

U.S. Pat. No. 4,407,723 of MacGregor et al. disclosed a method for making carbon dioxide absorbents. Pure calcium hydroxide and water were mixed into a paste, extruded through a grate (e.g., meat grinder), air-dried into hardened granules, and then sized through sieves to obtain uniform size. Subsequently, an aqueous solution containing sodium hydroxide, potassium hydroxide, calcium chloride, and water was sprayed and absorbed onto the granules. Thus, the method required an extra manufacturing step, and also did not guarantee that all surfaces of the particles were sufficiently treated.

Thus, it is another objective of the present invention to provide for convenience and efficiency in the manufacturing of absorbent particles.

In U.S. Pat. No. 6,228,150, Armstrong et al. disclosed a carbon dioxide absorbent that included calcium hydroxide and a "humectant." The humectant was considered to be either "hygroscopic" (which meant that it absorbed atmospheric water) or "deliquescent" (which meant that it absorbed atmospheric water and dissolved in the water thus absorbed). Preferred by Armstrong et al. was calcium chloride as a humectant. Armstrong et al. also wanted their calcium hydroxide-based absorbents essentially free of sodium and potassium hydroxide, purportedly to avoid carbon monoxide and Compound A arising from degradation of anesthetic agents.

Thus, it is a further objective of the present invention to avoid substantial degradation of anesthetic agents, while also providing the option of employing sodium and/or potassium hydroxide in the absorbent composition to improve carbon dioxide absorption efficiency.

Thus, a novel absorbent composition and method of manufacture are needed to avoid certain disadvantages of the prior art as mentioned above.

SUMMARY OF THE INVENTION

In surmounting the disadvantages of the prior art, the present invention provides carbon dioxide absorbent particles formed from a composition comprising calcium hydroxide, water, and a rheology modifier. The rheology modifier is a phosphonic acid or salt thereof. The absorbent particles have excellent absorption performance and can be conveniently and efficiently manufactured using conventional equipment.

Other exemplary absorbent particles of the invention further comprise sodium hydroxide and/or potassium hydroxide, calcium chloride, a pH-sensitive color indicator dye (e.g., diethyl violet), or a mixture thereof. Surprisingly, the incorporation into the particle matrix of sodium and/or potassium hydroxide, in combination with calcium chloride and color indicator dye, has numerous benefits in terms of anesthetic agent compatibility, color dye steadfastness, and extrusion efficiency.

For example, the present inventor finds that when calcium chloride is incorporated in an amount of 0.25–3.0% by total dry weight of absorbent composition, the color indicator dye (e.g., diethyl violet) does not lose color after color indication is achieved. Although the addition of calcium chloride to a wet calcium hydroxide paste can otherwise lead to agglomeration and stiffening of the paste mixture in the mixing and extrusion equipment, the use of a phosphonic acid/salt rheology modifier facilitates the mixing and extrusion processes and results in particles having strength, excellent pore structure, and crush resistance. Moreover, the particles do not create odors or demonstrate initial (dis)coloration and exhibit excellent carbon dioxide absorption performance.

An exemplary method of the invention comprises mixing the calcium hydroxide, water, and rheology modifier together, optionally with sodium and/or potassium hydroxide, calcium chloride, and color indicator dye, to form a paste; extruding or molding the paste into a plurality of particles; and allowing or causing the particles to harden.

Additional advantages and features of the present invention are described in further detail hereinafter.

DETAILED DESCRIPTION OF PREFERRED EMBODIMENTS

An exemplary carbon dioxide absorbent of the present invention comprises calcium hydroxide in an amount of 83% to 99%, and a rheology modifier in an amount of 0.05% to 5.0%, all percentages herein being based on total dry weight of the absorbent composition. The phrase "total dry weight" as used herein shall refer to the composition, after the components are mixed together with water to form a paste, formed into a plurality of particles while in paste form, and oven dried so that water content is less than 0.1% by weight.

Therefore, unless indicated otherwise, all percentages set forth herein are based on the total dry weight of components (excluding water moisture) in the hardened or solidified absorbent and expressed as "% dry wt". The percentage of water shall be expressed in terms of percentage total weight ("% total wt).

In further exemplary absorbent compositions, sodium hydroxide, potassium hydroxide, or a mixture thereof, in the amount of 0.01% to 6.0% dry wt, more preferably 0.1% to 2.0% dry wt, and most preferably 0.1 to 1.0% dry wt can be incorporated into the absorbent composition.

Still other exemplary absorbents of the invention comprise calcium chloride and a pH-sensitive color indicator dye. For example, calcium chloride can be incorporated in the amount of 0.1% to 6.0% dry wt, more preferably 0.25% to 3.0% dry wt, and most preferably 0.5 to 2% dry wt; and a pH-sensitive color indicator dye can be incorporated in the amount of 0.01% to 0.5% dry wt, more preferably 0.02% to 0.2% dry wt, and most preferably 0.02 to 0.1% dry wt can also be incorporated into the absorbent composition. When calcium chloride is intimately incorporated into the absorbent composition matrix in an amount of at least 0.5% dry wt, the present inventor finds that pH-sensitive color indicator dyes, such as diethyl violet ("DEV") and thiazol yellow G, will not revert to a colorless state when sufficient amounts of carbon dioxide have been absorbed in the composition and the pH-sensitive color dye has changed (in the case of DEV to a dark purple). Other acceptable dyes include ethyl violet, basic violet, Clayton yellow, direct yellow 9 and Titan yellow.

The absorbent particles of the invention are preferably processed by mixing the raw materials together to form a paste, then extruding the paste through a die into granular particles having an average length of 1–10 mm and an average width of 0.5–5.0 mm. Alternatively, the particles may be molded or pelletized using trays or molds. The particles are allowed to dry (in ambient air) or caused to dry or harden (by heating in an oven) so that they can be packed into bags, containers or cartridges. After being allowed or caused to harden, the particles are then sieved to obtain the desired particle sizes and then rehydrated by spraying water onto their outer surfaces to ensure that they have sufficient water content (5–25% by total weight of absorbent, more preferably 12–19%) to facilitate absorption of carbon dioxide. Typically, absorbent particles are used in a 4–8 mesh granular size (e.g., 2.36–4.75 mm mesh size openings), although 6–12 mesh granular sizes (1.70–3.35 mm mesh size openings) may also be used. It is contemplated that absorbent compositions of the invention are ideally suited for making particles having similar average size when conventional mixing and extrusion or molding methods are employed for forming the absorbent into particles for use in inhalation anesthesiology devices and other rebreathing devices.

A preferred rheology modifier suitable for plasticizing exemplary absorbent compositions of the present invention is phosphonic acid or a salt thereof. Exemplary phosphonic acids or salts include the following:

amino tri (methylene-phosphonic acid) (which is synonymous with phosphonic acid, nitrilotis (methylene) tri)

amino tri (methylene-phosphonic acid), pentasodium salt (which is synonymous with phosphonic acid, nitrilotris (methylene) tri-penta sodium salt)

1-hydroxyethylene-1,1,-diphosphonic acid (which is synonymous with (hydroxyethylidene) diphosphonic acid))

1-hydroxyethylene-1,1,-diphosphonic acid tetra sodium salt (which is synonymous with hydroxyethylidene diphosphonic acid tetra sodium salt)

diethylenetriamine penta(methylene phosphonic acid) (which is synonymous with phosphonic acid), [(phosphonomethyl)imino]bis[2,1-ethanediylnitrilobis (methylene)]] tetrakis [(phosphonomethyl)imino]bis[2, 1-ethanediylnitrilobis(methylene)]] tetrakis, pentasodium salt 2-phosphonobutane-1,2,4-tricarboxylic acid.

These phosphonic acids, or the salts thereof (e.g., alkali or alkaline earth metals), can be incorporated into the absorbent composition in the amount of 0.05 to 5% dry wt, more preferably 0.1 to 1.5% dry wt, and most preferably 0.1 to 0.6% dry wt.

It is contemplated that other phosphonic acids and phosphonates would be suitable for the uses of the present invention, in addition to those which have been identified above for illustrative purposes, as known to those of skilled in the art with the benefit of the present invention disclosure. Phosphonic acids and/or salts thereof which are believed suitable for use in the present invention are available from one or more of the following manufacturers: Bayer Corporation of Pittsburg, Pa.; Digital Specialty Chemicals, Inc. of Dublin, N.H.; Solutia, Inc. of St. Louis, Mo.; and Wujin Fine Chemical Factory of Jiangsu, China.

Preferred absorbent particles of the invention have a porosity of 20–60%, more preferably 25–50%, and most preferably 30–45%, all porosity percentages provided herein referring to pore volume in the absorbent composition matrix after mixing, extrusion, and oven drying of the particles. Porosity provides a measure of the amount of surface area of the particles that is available for reaction with carbon dioxide. The pore volume is expressed in terms of cubic centimeters per 100 grams of dry weight of the carbon dioxide absorbent composition particles (cc/100 gms dry wt) with all moisture removed (i.e., less than 0.1% moisture content). Porosity is determined by saturating a known weight of the dried absorbent composition with iso-octane, draining off all excess iso-octane solvent, and determining the weight and volume of iso-octane absorbed by the absorbent particles. The iso-octane is not physically absorbed by the particles and only occupies the pore space contained in the particles.

Preferred absorbent particles of the invention should have a hardness of 75% to 99%, and more preferably 80–95%, the hardness percentages being calculated as follows. The measurement of "hardness" is an indirect measure of the strength and friability of the absorbent particles after the absorbent composition is mixed, extruded, and allowed to harden into solid particles. Unlike the porosity test, however, the dried solid particles should be hardness-tested with 12–19% water content. Particles are screened through a stack of sieves consisting of progressively smaller and smaller opening sizes: 4-mesh, 6-mesh, and 8-mesh (which corresponds to US ASTM E11 sieves with opening of 4.75 mm, 3.35 mm, 2.36 mm, respectively) to remove particles having coarseness greater than 4-mesh and fineness less than 8-mesh. Fifty grams of the sample particles retained on the 6-mesh screen are placed into a steel cylindrical cup, having a slightly concave bottom, into which a close-fitting cylindrical piston is placed. The piston is connected to a hydraulic air piston, and pressure is exerted through the piston and imparted into the particles in the cup for 10 seconds, such that the resultant pressure is 90 pounds per square inch at the plunger contact against the particles. The contents of the pressurized particles are then placed onto a 12-mesh sieve (1.70 mm openings), and shaken using a sieve shaker (e.g., RO-TAP) for 30 seconds, and the weight of the particles that have fallen through the 12-mesh sieve is measured. Hence, hardness is calculated by determining the percentage of material that remains coarser than the 12-mesh sieve (1.70 mm) after subjecting the absorbent particles to the aforementioned controlled crushing action.

The following examples are provided for illustrative purposes only, and are not intended to limit the scope of the invention.

EXAMPLE 1

Carbon dioxide absorbent in particle form can be made as follows. The following components can be added into a paddle or bladed mixer, such as a sigma blade mixer, in accordance with the percentages provided above, in any order. The inventor prefers the following order for adding the ingredients: calcium hydroxide, water, diethyl violet color indicator dye, calcium chloride, and (optionally) sodium hydroxide. The components are mixed together at low speed for about one to five minutes until a paste is obtained having the general consistency of a cookie dough batter. The paste is discharged into an extruder having 1–3 mm hole openings, and the paste is extruded into spaghetti-shaped noodles which are dried in an oven until hard. The extrudate is then to be crushed gently to break the absorbent into separate particles that can be sieved to achieve the desired size particles and sprayed with water to ensure that water content is 12–19% based on total weight of the particles. However, one of the problems of the particular composition is that during mixing and extrusion, the composition begins to stiffen noticeably after a few minutes, and the rate of stiffening corresponds with the increase in concentration of calcium chloride in the mix.

EXAMPLE 2

Test A (Control)

Into the hopper of an in-line continuous paddle mixer, an absorbent composition comprising calcium hydroxide, sodium hydroxide (optional), and diethyl violet were combined with water (30% by wt) to form a paste that was extruded through a die. The paste was observed to be somewhat harsh and slightly difficult to extrude, because there was a strain placed on the equipment. Additional water had to be added to facilitate mixing and extrusion; however, this added water increased the porosity and reduced the hardness and strength of the resultant particles.

Test B

When calcium chloride was incorporated into the absorbent composition described above in Test A, the resultant paste could not be extruded through the in-line paddle mixer after 10–20 minutes, even when additional water was added to the paste mixture. Furthermore, the extruder became plugged so that the equipment needed to be shut down and cleaned out. Thus, the addition of calcium chloride was observed to produce a harsher mix due to agglomeration of the calcium hydroxide particles and stiffening of the paste mixture.

Test C

When a phosphonic acid or salt was incorporated into the absorbent composition described in Test B, the paddle mixer and extruder did not plug up and the paste mixture demonstrated a highly workable consistency. Moreover, the particles were extruded with ease and demonstrated a smoother surface than was seen on the particles produced in Tests A and B. A summary of the effect of various test compositions on processing and extrusion is provided below in Table 1.

TABLE 1

| Test | Processing and Extrusion |
| --- | --- |
| A | slightly difficult to extrude |
| B | Very poor, not able to be extruded |
| C | Good workability and extrusion |

EXAMPLE 3

The carbon dioxide absorption performance of an absorbent is best determined by evaluating its performance under conditions similar to actual use. For use in medical applications and anesthesia machines, a simulated medical test for carbon dioxide absorbency performance was accomplished as follows.

Composition #1

A control carbon dioxide absorbent composition was formulated as follows: calcium hydroxide (98–99% dry wt); sodium hydroxide (0.1–1% dry wt); diethyl violet (0.02–0.1% dry wt); and water (28–33% total weight).

Composition #2

A carbon dioxide absorbent composition of the present invention was formulated as follows: calcium hydroxide (96–99% dry wt); sodium hydroxide (0.1–1.0% dry wt); diethyl violet (0.02–0.1% dry wt); calcium chloride (0.5–2.0% dry wt); water (28–33% by total weight); and a phosphonic acid/salt (0.1–0.6% dry wt).

The compositions were mixed into a paste using a continuous in-line paddle mixer and extruded through a die to form particles, which were oven dried and then sized to produce 4–8 mesh particles. Water was then sprayed onto the particle surfaces to ensure a moisture content of 12–19% by total weight.

Composition #1 had a porosity of 36.2 cc/100 gm and a hardness of 92.8% and Composition #2 had a porosity of 43.5 cc/100 gm and a hardness of 85.9%.

Each composition was then tested in a simulated medical test using an Ohmeda anesthesia machine (Datex-Ohmeda, Inc.) at an oxygen fresh gas flow of 1 liter/minute, ventilator settings of 1 liter tidal volume and 10 breaths per minute, 160 cc/minute carbon dioxide gas flow into a test lung to simulate a 72.6 kg human patient under anesthesia, and using 1,050 gm of absorbent in particle form. Carbon dioxide gas is fed continuously into the test lung, exits into the expiratory side of the breathing circuit and then through the absorbent until the absorbent does not fully absorb all the carbon dioxide. Hence, the "$CO_2$ breakthrough" point was determined when 0.5% of the effluent coming through the particles on the inspiratory side of the breathing circuit (to the patient) was carbon dioxide that was not being absorbed. Each composition was tested four times until 0.5% $CO_2$ breakthrough and the results averaged Composition #1 was found to have a $CO_2$ breakthrough after 20.9 hours, while Composition #2 was found to have $CO_2$ breakthrough after 24.2 hours. Thus, the exemplary composition (#2) of the present invention was shown to have a significant improvement in terms of carbon dioxide absorption performance. A summary of the effect of the composition with and without $CaCl_2$ and phosphonate plasticizer on $CO_2$ absorption performance is provided below in Table 2. A commercial product, Amsorb™, (Armstrong Medical Ltd, Coleraine, N. Ireland) which is a mixture of $Ca(OH)_2$, approximately 1% $CaCl_2$, and approximately 1% $CaSO_4$ hemihydrate, is included for comparison and was found to have significantly lower performance.

TABLE 2

|  | Hours to 0.5% $CO_2$ breakthrough | Porosity, cc/100 gm | Hardness % |
| --- | --- | --- | --- |
| Composition #1 | 20.9 +/− 1.2 | 36.2 | 92.8 |
| Composition #2 | 24.2 +/− 0.3 | 43.5 | 85.9 |
| Amsorb ™ | 14.6 +/− 0.8 | 38.7 | 88.4 |

EXAMPLE 4

Compositions #1 and #2, described above in Example 3, were each tested for performance in terms of diethyl violet color indicator dye steadfastness. The color behavior of the compositions were observed at the end of the simulated medical test described in Example 3. After the Ohmeda anesthesia machine was turned off, the purple colors of the absorbent particles were observed over time. It was observed that Composition #1 faded to colorless after 4–8 hours, while the Composition #2 remained purple even after 4–8 weeks.

EXAMPLE 5

Composition #1 and #2, described above in Example 3, were tested with respect to degradation effects on a volatile anesthetic agent. Each composition was placed into an Ohmeda anesthesia machine under the following conditions and tested using a 1.5% concentration of sevoflurane (in the breathing circuit): 0.5 liter/min oxygen fresh gas flow; 500 cc tidal volume; 16 breaths per minute, 450 cc/min carbon dioxide gas flow, and using 1,050 gms of absorbent in particle form. The concentration of Compound A increases with temperature, so a high flow rate of carbon dioxide gas was used in order to increase the temperature of the absorbent to 57–60° C. due to the exothermic reaction between $CO_2$ and $Ca(OH)_2$. The samples were tested over a period of 60 to 120 minutes, and samples were taken every 20 minutes and analyzed by gas chromatography for the decomposition product, Compound A. The concentration of Compound A would peak at 40 minutes, then decrease slightly between 40 to 120 minutes. Each composition was tested three times and the results averaged. Composition #1 was found to have a peak value of 24.3 ppm of Compound A. Composition #2 was found to have a peak value of 1.8 ppm of Compound A.

A summary of the effect of Composition #1 and #2 on the degradation of sevoflurane to Compound A and of desflurane to carbon monoxide (discussed below in Example 6) are provided below in Table 3. Composition #2, which contains the phosphonate rheology modifier, has minimized or reduced the degradation of the anesthetic agents. The results for Amsorb™ are included for comparison and are similar to those for Composition #2.

TABLE 3

|  | Compound A Peak value, ppm | Carbon Monoxide peak value, ppm |
| --- | --- | --- |
| Composition #1 | 24.3 +/− 2.1 | 1,530 +/− 339 |
| Composition #2 | 1.8 +/− 0.1 | 0.0 |
| Amsorb ™ | 1.3 +/− 0.2 | 0.0 |

EXAMPLE 6

If $Ca(OH)_2$-based soda lime $CO_2$ absorbents are allowed to dry out, the volatile anesthetic agent, desflurane, will react with the dry absorbent and decompose to form carbon monoxide. Composition #1 and #2, described above in Example 3, were dried in an oven at 110° C. to remove all moisture, and then tested to determine the decomposition of desflurane into carbon monoxide. Each composition was placed into a Dräger anesthesia machine (Dräger Medical Inc.-USA) under the following conditions and tested using a 6% concentration of desflurane (in the breathing circuit): 0.5 liter/min oxygen fresh gas flow; 500 cc tidal volume; 16 breaths per minute, and using 1,050 gms of absorbent in particle form. No carbon dioxide was used in this test because the reaction between the absorbent and $CO_2$ would produce water, which would increase the moisture content of the absorbent and interfere with the test. The samples were tested over a period of 60 minutes, and samples were taken every 20 minutes and analyzed by gas chromatography for carbon monoxide. The concentration of carbon monoxide would peak at 20 minutes, then decrease between 20 and 60 minutes. Each composition was tested two times and the results averaged. Composition #1 was found to have a peak value of 1,530 ppm of carbon monoxide. Composition #2 was found to have a peak value of 0 ppm of carbon monoxide. Amsorb™ was found to have a peak value of 0 ppm of carbon monoxide.

EXAMPLE 7

Various plasticizers were tested but were found to be unsuccessful for achieving the objectives of the present invention.

A carbon dioxide absorbent composition (Composition #3, control) was formulated using calcium hydroxide (96–99% dry wt), sodium hydroxide (0.10–1.0% dry wt), calcium chloride (0.5–2.0% dry wt), diethyl violet dye (0.02–0.1% dry wt), and water (28–33% based on total weight). When this Composition #3 was placed into a continuous in-line paddle mixer or a sigma blade batch mixer, the paste was difficult to mix and extrude.

A plasticizer, calcium lignosulfonate, in the amount of 0.2–0.9% dry wt was incorporated into the absorbent. Processing was improved but a slight odor and tan color were imparted to the absorbent particles, and carbon dioxide absorption efficiency was reduced. Therefore, this plasticizer did not fulfill the purposes of the present invention.

Another plasticizer, naphthalene sulfonate condensate (DARACEM® 19, W. R. Grace & Co.-Conn.) in the amount of 0.4–1.0% dry wt, was also tested with the absorbent composition. Processing was improved and carbon dioxide absorption efficiency was good. However, the plasticizer imparted a moderate odor and a purple color to the unreacted particles, so that the plasticizer was deemed by the inventor to be unacceptable for medical purposes.

Another plasticizer, sodium gluconate, in the amount of 0.05–0.2% dry wt, was also tested with the absorbent composition. Processing and hardness were improved, and no color or odor was produced; but carbon dioxide absorption performance was reduced significantly. Hence, this plasticizer did not fulfill the objectives of the present invention.

Another plasticizer, a sodium polyacrylate, in the amount of 0.4–0.6% dry wt, was also tested with the absorbent composition. Processing was not significantly improved, if at all; and an odor was imparted to the absorbent. Hence, this plasticizer did not fulfill the objectives of the present invention.

Another plasticizer, a modified polyacrylic acid (ADVA® FLOW™, W. R. Grace & Co.-Conn.), in the amount of 0.2–0.6% dry wt, was also tested with the absorbent composition. Processing was extremely poor, and the paste mixture could not be mixed or extruded. Hence, this plasticizer could not fulfill the objectives of the present invention.

Another plasticizer, a modified polycarboxylate salt containing a defoamer (ADVA® 100™, W. R. Grace & Co.-Conn.), in the amount of 0.06–0.49% dry wt, was also tested with the absorbent composition. Processing was improved slightly, and carbon dioxide absorption efficiency was improved; but a slight odor was imparted to the absorbent. Hence, this plasticizer did not fulfill the objectives of the present invention.

Another plasticizer, citric acid, in the amount of 0.02–0.8% dry wt, was also tested with the absorbent composition. Processing was improved, but the particles had low hardness and carbon dioxide absorption performance was reduced significantly. Hence, this plasticizer did not fulfill the objectives of the present invention.

A fumed silica (e.g., CAB-O-SIL™ from Cabot Corporation) in the amount of 1–2% dry wt, was also tested with the absorbent composition. While processing was noticeably improved, the particles showed decreased carbon dioxide absorbency, and hence objectives of the present invention were not achieved.

In contrast, when numerous phosphonic acids or salts (as identified in the foregoing specification) were incorporated as a rheology modifier into the absorbent composition, the composition became easier to mix and extrude. The resultant particles had no odor or discoloration, and had strength and excellent carbon dioxide absorption performance.

A summary of the effect of various plasticizing agents on processing, odor, color and simulated medical test $CO_2$ absorption performance is provided in Table 4.

TABLE 4

| Plasticizer | Concentration (% w/w) | Processing | Odor | Color | Medical Test |
|---|---|---|---|---|---|
| Composition #3, no plasticizer | 0 | Poor | None | None | Control |
| Calcium lignin sulfonate | 0.2–0.9 | Improved | Slight | Tan | Reduce |
| Napthalene sulfonate condensate | 0.4–1.0 | Improved | Moderate | Purple | Good |
| Sodium gluconate | 0.05–0.2 | Improved | None | None | Poor |
| Sodium polyacrylate | 0.4–0.6 | No change | Slight | None | Good |
| Modified polyacrylic acid | 0.2–0.6 | Poor | Slight | None | Not determined |

TABLE 4-continued

| Plasticizer | Concentration (% w/w) | Processing | Odor | Color | Medical Test |
|---|---|---|---|---|---|
| Sodium polycarboxylate | 0.06–0.49 | Slightly better | Slight | None | Very good |
| Citric acid | 0.02–0.8 | Good | None | None | Poor |
| Fumed silica | 1–2 | Very good | None | None | Poor |
| Phosphonic acid/Phosphonate | 0.1–0.5 | Very good | None | None | Very good |

The foregoing examples and exemplary embodiments are provided above for illustrative purposes only and are not intended to limit the scope of the present invention.

It is claimed:

1. A carbon dioxide absorbent, comprising: calcium hydroxide in an amount no less than 83% dry wt and in an amount no greater than 99% dry wt; water in an amount no less than 5% total wt and in an amount no greater than 25% total wt; and a rheology modifier in an amount no less than 0.05% dry wt and in an amount no greater than 5.0% dry wt.

2. The carbon dioxide absorbent of claim 1 wherein said absorbent is in the form of particles having an average length no less than 1 mm and an average length no greater than 10 mm, and having an average width no less than 0.5 mm and an average width no greater than 5.0 mm.

3. The carbon dioxide absorbent of claim 1 further comprising calcium chloride in an amount no less than 0.1% dry wt and in an amount no greater than 6.0% dry wt, and a color indicator dye selected from the group consisting of diethyl violet and thiozol yellow G, said color indicator dye being present in an amount no less than 0.01% dry wt and in an amount no greater than 0.5% dry wt.

4. The carbon dioxide absorbent of claim 3 wherein said wherein said calcium chloride is present in an amount no less than 0.25% dry wt.

5. The carbon dioxide absorbent of claim 4 wherein said color indicator dye is diethyl violet which is present in the amount of 0.02%–0.2% dry wt.

6. The carbon dioxide absorbent of claim 4 further comprising sodium hydroxide, potassium hydroxide, or mixture thereof, being present in an amount no less than 0.01% dry wt and in an amount no greater than 6.0% dry wt.

7. The carbon dioxide absorbent of claim 1 wherein said rheology modifying agent is a phosphonic acid or salt thereof, said rheology modifying agent being present in an amount no less than 0.05% dry wt and in an amount no greater than 5.0% dry wt.

8. The carbon dioxide composition of claim 7 wherein said phosphonic acid or salt is selected from the group consisting of amino tri (methylene-phosphonic acid) (which is synonymous with phosphonic acid, nitrilotis (methylene)tri);

amino tri (methylene-phosphonic acid), pentasodium salt (which is synonymous with phosphonic acid, nitrilotris (methylene)tri-penta sodium salt);

1-hydroxyethylene-1,1,-diphosphonic acid (which is synonymous with (hydroxyethylidene)diphosphonic acid));

1-hydroxyethylene-1,1,-diphosphonic acid tetra sodium salt (which is synonymous with hydroxyethylidene diphosphonic acid tetra sodium salt);

diethylenetriamine penta(methylene phosphonic acid) (which is synonymous with phosphonic acid), [(phosphonomethyl)imino]bis[2,1-ethanediylnitrilobis (methylene)]] tetrakis;

diethylenetriamine penta(methylene phosphonic acid), pentasodium salt (which is synonymous with phosphonic acid, [(phosphonomethyl)imino]bis[2,1-ethanediylnitrilobis(methylene)]]tetrakis, pentasodium salt; and 2-phosphonobutane-1,2,4-tricarboxylic acid.

9. The carbon dioxide composition of claim 7 wherein said phosphonic acid or salt is selected from the group consisting of phosphonic acid, nitrilotis (methylene)tri;

phosphonic acid, nitrilotris (methylene)tri-penta sodium salt;

hydroxyethylidene diphosphonic acid;

hydroxyethylidene diphosphonic acid tetra sodium salt;

phosphonic acid, [(phosphonomethyl)imino]bis[2,1-ethanediylnitrilobis(methylene)]]tetrakis;

phosphonic acid, [(phosphonomethyl)imino]bis[2,1-ethanediylnitrilobis(methylene)]]tetrakis, pentasodium salt; and 2-phosphonobutane-1,2,4-tricarboxylic acid.

10. The carbon dioxide composition of claim 7 wherein said phosphonic acid or salt is diethylenetriamine penta (methylene phosphonic acid) or the salt thereof.

11. The carbon dioxide composition of claim 7 wherein said rheology modifier is diethylenetriamine penta (methylenephosphonic acid).

12. The carbon dioxide absorbent of claim 7 wherein said rheology modifier is present in an amount no less than 0.1% dry wt and in an amount no greater than 1.5% dry wt.

13. The carbon dioxide absorbent of claim 12 wherein said rheology modifier is present in an amount no greater than 0.6% dry wt.

14. The carbon dioxide absorbent of claim 7 wherein water is present in an amount no less than 12% total wt and in an amount no greater than 19% total wt.

15. The carbon dioxide absorbent of claim 1 wherein the particles have a porosity of 20–60% dry wt.

16. A carbon dioxide absorbent, comprising: calcium hydroxide, water, sodium and/or potassium hydroxide, calcium chloride, a pH-sensitive color indicator dye, and a phosphonic acid or salt thereof.

17. The carbon dioxide absorbent of claim 16 wherein said color indicator dye is selected from the group consisting of diethyl violet and thiazol yellow G.

18. The carbon dioxide absorbent of claim 17 wherein the particles have a porosity of 30–45% dry wt.

19. A process for making a carbon dioxide absorbent, comprising: combining calcium hydroxide, water, and a phosphonic acid or salt therof to form a paste; forming said paste into particles; and allowing or causing said particles to harden.

20. The process of claim 19 wherein, in said forming step, said paste is extruded, molded, or pelletized.

\* \* \* \* \*